United States Patent [19]

Larker

[11] 3,934,442
[45] Jan. 27, 1976

[54] PRESS FOR HYDROSTATIC EXTRUSION
[75] Inventor: Hans Larker, Robertsfors, Sweden
[73] Assignee: Allmanna Svenska Elektriska Aktiebolaget, Vasteras, Sweden
[22] Filed: Aug. 15, 1974
[21] Appl. No.: 497,834

[30] Foreign Application Priority Data
Sept. 5, 1973  Sweden.............................. 7312058

[52] U.S. Cl. ..................................... 72/60; 72/272
[51] Int. Cl.² ......................................... B21C 27/00
[58] Field of Search ........ 72/60, 272; 277/190, 115, 277/117

[56]     References Cited
        UNITED STATES PATENTS
3,379,043  4/1968  Fuchs, Jr. ............................... 72/60
3,459,021  8/1969  Fuchs, Jr. ............................... 72/60
3,467,273  9/1969  Campbell et al..................... 220/46
3,557,996  1/1971  Campbell............................. 72/272
3,559,436  2/1971  Nilsson ................................. 72/60
3,606,356  9/1971  Beroset............................... 277/190
3,817,517  6/1974  Lundquist...................... 277/190 X Primary Examiner—Milton S. Mehr

[57]  ABSTRACT

In a press for hydrostatic extrusion which has a prestressed outer supporting member and an inner tube or liner, the end surfaces of the inner tube are inwardly inclined towards its center with an inclination of at least 1:20, and the seal holders which take up forces operating on the seals have inclined end surfaces which make contact with the inclined end surface of the inner tube. The sealing arrangement includes a first sealing ring with a cylindrical inner surface which contacts the punch and the die respectively, and an end surface making contact with the support ring, and a second sealing ring with an outer cylindrical sealing surface which makes contact with the inner tube and an inclined end surface which makes contact with the inclined end surface of the support ring.

2 Claims, 2 Drawing Figures

PRESS FOR HYDROSTATIC EXTRUSION

BACKGROUND OF THE INVENTION

1. Field of the Invention

The invention relates to presses for hydrostatic extrusion.

2. The Prior Art

The present invention relates to a press for hydrostatic extrusion of the kind comprising a press stand in which there is arranged a pressure chamber formed from a high-pressure cylinder with an inner tube (liner) surrounded by at least an outer tube and/or a prestressed strip sheath, a pressure-generating punch insertable into the cylinder for generating a high pressure in a pressure medium enclosed in the pressure chamber, and a die insertable into the cylinder and having an opening with the cross-section which the extrusion product is to acquire. Between the inner tube (liner) of the cylinder and the pressure-generating punch and the die, respectively, there are seals, usually of the type containing a first sealing ring with a cylindrical surface making contact with the punch and the die, respectively, and an end surface making contact with a seal holder and a second sealing ring with an outer cylindrical surface making contact with the inner tube (liner) of the cylinder and an end surface making contact with said seal holder. Further the press comprises an operating device for inserting a billet into the high-pressure cylinder and for pushing in the pressure-generating punch into the cylinder for generating a pressure in a pressure medium surrounding the billet in the pressure chamber, which is required for extrusion, the billet material being pressed out through the die opening, thus obtaining a product having the desired cross-section. A press of the kind described above is described more fully in U.S. Pat. No. 3,620,059.

In hydrostatic extrusion the pressure in the pressure chamber is between 10 and 15 kbar, which means that the stresses in the cylinder included in the pressure chamber will be very high. Furthermore, the pressure varies between 1 bar and the said high value for each work cycle, which results in risks of fatigue in the cylinder material. The corners of the inner surface of the cylinder and its end surfaces are subjected to the highest and most dangerous stresses and are thus most critical from the point of view of fatigue. In order to increase the life of the inner tube (liner) a reduction of the stresses in this critical part is necessary. Moving the seal inwards so that the outer part of the cylinder is not subjected to a radial pressure from the pressure medium is favourable from the point of view of fatigue. It is not possible to obtain a satisfactory support for a seal inside the cylinder at a distance from the end surface at the high pressure used because of the increase in diameter of the cylinder when the pressure is raised to the extrusion level. In order to obtain a satisfactory support, a support for the seal must be used which makes contact with the end surface of the inner tube and which bridges the whole gap between the cylinder wall and the pressure-generating punch and the die, respectively, both in case of unloaded and loaded pressure-chamber cylinder, apart from the necessary minor clearances.

SUMMARY OF THE INVENTION

According to the invention the stresses at the corner between the inner surface of an inner tube (a liner) and its end surfaces are reduced by making the end surfaces so that they incline towards the centre of the cylinder. To some extent a stress-reducing effect is then obtained similar to that obtained by moving seals in gaps between the cylinder and the pressure-generating punch and the die, respectively. The inclination of the end surface should be greater than 1:20, preferably greater than 1:10. In case of a tube thickness (liner thickness) of 50 mm, the end surface thus inclines 5 mm, i.e. the inner length of the tube will be 10 mm smaller than its outer length. The support of the seal may be in the form of a ring which forms part of a seal holder. The end surface of the ring facing the cylinder has substantially the same inclination as the end surface of the tube and makes contact with it. Usually the seal includes a first sealing ring having a cylindrical inner surface making contact with the punch and the die, respectively, and a second sealing ring having an outer cylindrical surface making contact with the inner tube (liner) of the cylinder and an inclined end surface making contact with the inclined end surface of the support ring.

The simple measure of making the inner tube of the cylinder with end surfaces inclined towards the centre of the cylinder instead of plane endsurfaces is surprisingly favourable from the point of view of strength. It appears to be possible to reduce the stress amplitude at the critical corner between the inner surface of the cylinder and its end surfaces by up to 20 percent and substantially to prevent the occurrence of tensile strains at the corner when maximum pressure prevails in the pressure chamber.

Theoretically a considerable increase of the life of the inner tube (liner) can be expected. A doubling, possibly a trebling of the life is feasible. Technically and economically, this is a great step forward, since the highpressure cylinder is an expensive press part and its length of service strongly influences the cost of the extrusion.

BRIEF DESCRIPTION OF THE DRAWING

The invention is described more fully with reference to the accompanying drawings.

DESCRIPTION OF THE PREFERRED EMBODIMENTS

Figure 1:
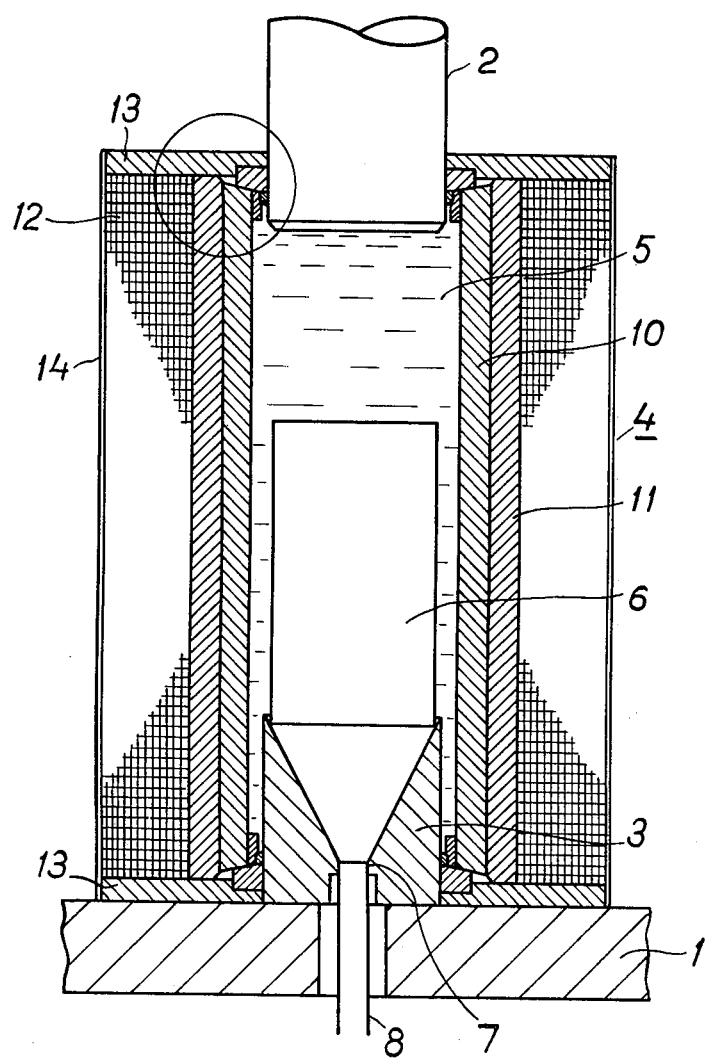
FIG. 1 shows schematically a high-pressure chamber in a hydrostatic extrusion press and FIG. 2 on an enlarged scale the section of the high-pressure chamber which is encircled in FIG. 1.
Figure 2:
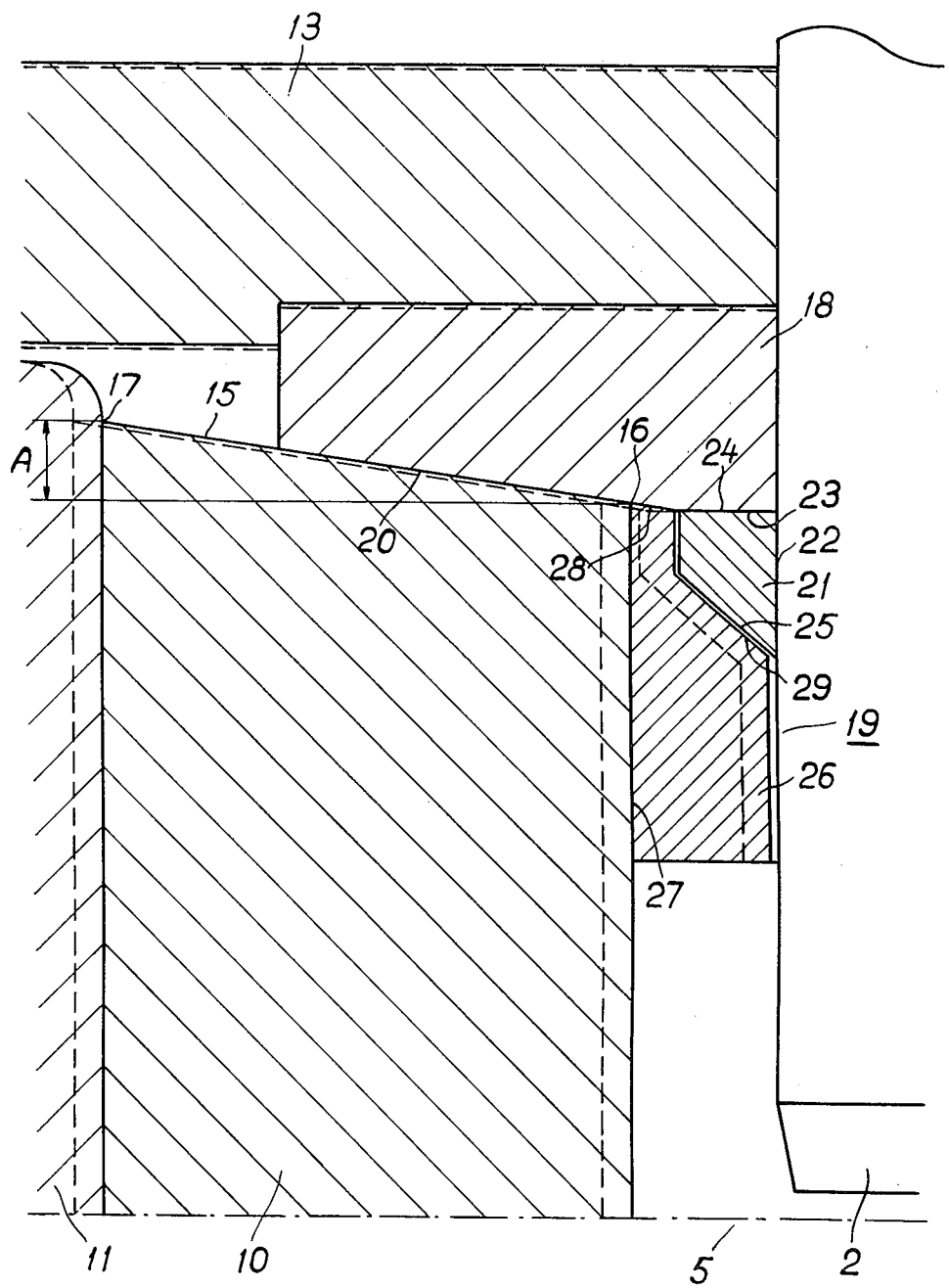

In the drawings, reference character 1 designates a press table, 2 a pressure-generating punch, 3 a die and 4 a high-pressure cylinder in a hydrostatic extrusion press the rest of which is not shown. The punch 2, the die 3 and the cylinder 4 form a pressure chamber 5. In the pressure chamber is a billet 6 which, under the influence of a surrounding pressure medium in the pressure chamber 5, is pressed out through the die opening 7 and is formed into a rod 8 when the punch 2 is inserted into the pressure chamber by an operating cylinder (not shown).

The cylinder 4 is of the type which is built up of an inner exchangeable tube (liner) 10, a second tube 11 and a prestressed strip sheath 12, end pieces 13 and an outer protecting plate 14. The tube 11 and the strip sheath 12 are applied around the tube (liner) 11 in a prestressed manner, so that at atmospheric pressure the tube 11 is subjected to a radial force causing tangential compressive forces. By means of this prestressing the tensile strains in the inner tube (liner) 10 are limited to a permissible value when working pressure prevails in the pressure chamber 5. The end surfaces 15 of the tube (liner) 10 incline toward the centre of the cylinder 4. The corner 16 will then be located at a distance A from the corner 17. Between the end piece 13, which also forms part of a seal holder taking up axial forces operating on a seal, and the tube (liner) 10 there is a support ring 18 which forms a second part of the seal holder for the seal 19, the end surface 20 of which facing the tube (liner) 10 has completely or partly the same inclination as the surface 15 and makes contact with it. The seal 19 is of the type which includes two metal rings. A first sealing ring 21 has a cylindrical surface 22 making contact with the pressure-generating punch 2, a plane end surface 23 making contact with a plane part 24 of the side of the support ring facing the pressure chamber, and a conical surface 25 facing the tube 10. A second sealing ring 26 has a cylindrical surface 27 making contact with the tube (liner) 10, an inclined conical end surface 28 making contact with the inner part of the inclined surface 15 of the support ring 18, and a conical surface 29 facing the conical surface 25 of the ring 21. The axial position of the ring is thus fixed by the support ring and the sealing ring 26.

The dashed lines show how the dimensions of the high-pressure cylinder 4 are widened when extrusion pressure prevails in the pressure chamber. This widening is important and involves considerable limitations when choosing the design of the seals and makes it practically impossible to locate the seal 19 inside the corner of the inner tube (liner) 10 in the gap between the tube (liner) 10 and the punch 2. The tube (liner) 10 is thus exposed to the extrusion pressure along its entire length. By making the end surface of the tube (liner) 10 inclined, a support is obtained which reduces the strains in the part which is most critical from the point of view of strength, namely the section around the corner 16.

I claim:

1. A high pressure apparatus with a pressure chamber having a high pressure cylinder comprising an inner tube 10 (liner) surrounded by a prestressed supporting member 11 and intended to enclose a pressure medium, a member projecting into the high pressure cylinder, a seal assembly comprising a seal holder 13, 18 at the end of the pressure chamber, first 21 and second 26 sealing rings of metal, the first ring having an inner cylindrical surface 22 making contact with the member projecting into the cylinder and an end surface 24 making contact with the seal holder, the second ring 26 having an outer surface 27 making contact with the cylinder wall and an end surface 28 making contact with the seal holder, the end surface of the inner tube being inwardly inclined towards the tube center and the seal holder having an inclined end surface abutting the inclined end surface of the inner tube.

2. A high pressure apparatus according to claim 1, in which the end surface of the second sealing ring is inwardly inclined towards the tube center and abuts the inclined surface of the seal holder.

* * * * *